(12) United States Patent
Mikuriya et al.

(10) Patent No.: US 10,414,438 B2
(45) Date of Patent: Sep. 17, 2019

(54) PARKING ASSISTANCE DEVICE AND PARKING ASSISTANCE METHOD

(71) Applicant: Nissan Motor Co., Ltd., Yokohama-shi, Kanagawa (JP)

(72) Inventors: Yutaka Mikuriya, Kanagawa (JP); Akinobu Goto, Kanagawa (JP); Satoshi Tange, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/736,546

(22) PCT Filed: Jun. 19, 2015

(86) PCT No.: PCT/JP2015/067742
§ 371 (c)(1),
(2) Date: Dec. 14, 2017

(87) PCT Pub. No.: WO2016/203643
PCT Pub. Date: Dec. 22, 2016

(65) Prior Publication Data
US 2018/0162446 A1   Jun. 14, 2018

(51) Int. Cl.
*B62D 15/02* (2006.01)
*B60R 21/00* (2006.01)
(52) U.S. Cl.
CPC .......... *B62D 15/0285* (2013.01); *B60R 21/00* (2013.01); *B62D 15/024* (2013.01); *B62D 15/027* (2013.01); *B62D 15/028* (2013.01)

(58) Field of Classification Search
CPC .. B62D 15/024; B62D 15/027; B62D 15/028; B62D 15/0285
See application file for complete search history.

(56) References Cited

U.S. PATENT DOCUMENTS

| | | | |
|---|---|---|---|
| 9,174,676 B2 | 11/2015 | Jecker et al. | |
| 2004/0204807 A1* | 10/2004 | Kimura et al. | B62D 15/028 701/36 |
| 2008/0154464 A1* | 6/2008 | Sasajima et al. | B62D 15/0285 701/42 |
| 2010/0019934 A1* | 1/2010 | Takano | B62D 15/028 340/932.2 |
| 2010/0089677 A1* | 4/2010 | Tanaka et al. | B62D 15/027 180/204 |
| 2010/0100270 A1 | 4/2010 | Kuo et al. | |

(Continued)

FOREIGN PATENT DOCUMENTS

| EP | 2116425 A1 | 11/2009 |
|---|---|---|
| EP | 2202132 A2 | 6/2010 |

(Continued)

*Primary Examiner* — Dale W Hilgendorf
(74) *Attorney, Agent, or Firm* — Young Basile Hanlon & MacFarlane, P.C.

(57) ABSTRACT

A parking assistance device generates a route along which a vehicle is to travel to a parking spot via a reversing position. The parking assistance device looks up attitude angles of the vehicle at the reversing position based on the width of the vehicle passage to enable generation of the route in which a front portion of the vehicle will not interfere at the reversing position with an obstacle adjacent to the vehicle passage in a width direction thereof.

18 Claims, 16 Drawing Sheets

(56) References Cited

U.S. PATENT DOCUMENTS

| | | | |
|---|---|---|---|
| 2012/0072067 A1* | 3/2012 | Jecker et al. | B62D 15/0285 |
| | | | 701/25 |
| 2013/0073119 A1 | 3/2013 | Huger et al. | |
| 2014/0365108 A1* | 12/2014 | You | B62D 15/0285 |
| | | | 701/408 |
| 2015/0151789 A1* | 6/2015 | Lee et al. | B62D 15/0285 |
| | | | 701/41 |
| 2016/0159397 A1* | 6/2016 | Baek | B62D 15/0285 |
| | | | 701/41 |
| 2016/0272244 A1* | 9/2016 | Imai et al. | B62D 15/0285 |

FOREIGN PATENT DOCUMENTS

| | | |
|---|---|---|
| JP | 2001107594 A | 4/2001 |
| JP | 2011001029 A | 1/2011 |
| JP | 2012528755 A | 11/2012 |
| JP | 2014034230 A | 2/2014 |
| KR | 20100055720 A | 5/2010 |
| KR | 20100075750 A | 7/2010 |
| KR | 20140144470 A | 12/2014 |
| WO | 2015060354 A1 | 4/2015 |

\* cited by examiner

PARKING ASSISTANCE DEVICE AND PARKING ASSISTANCE METHOD

TECHNICAL FIELD

The present invention relates to a parking assistance device and a parking assistance method which assist a parking operation in which a vehicle is perpendicularly parked in a parkable area.

BACKGROUND

There is known a parking assistance device configured to assist a parking operation in which a vehicle is parked by traveling in reverse from a reverse start position toward a target parking position (see Japanese Patent Application Publication No. 2011-001029). In Japanese Patent Application Publication No. 2011-001029, the parking assistance is performed while avoiding avoidance points set around the target parking position.

However, the parking assistance device described in Japanese Patent Application Publication No. 2011-001029 focuses only on avoiding collision in the route along which the vehicle travels in reverse from the reverse start position toward the target parking position. Accordingly, when the width of a vehicle passage which a parkable area faces is small, the vehicle will interfere with an obstacle at the reverse start position. Thus, the parking assistance can be performed only in limited situations.

SUMMARY

The present invention has been made in view of the problem described above, and an object thereof is to provide a parking assistance device and a parking assistance method which can generate a route in which a vehicle will not interfere with an obstacle around a vehicle passage also in an environment in which the width of the vehicle passage is small.

A parking assistance device according to one aspect of the present invention generates a route along which a vehicle is to travel to the parkable area via a reversing position. The parking assistance device looks up attitude angles of the vehicle at the reversing position based on the width of a vehicle passage to enable generation of the route in which a front portion of the vehicle will not interfere at the reversing position with an obstacle adjacent to the vehicle passage in a width direction thereof.

According to one aspect of the present invention, the route in which the vehicle will not interfere with the obstacle around the vehicle passage can be generated also in an environment in which the width of the vehicle passage small, by looking up the attitude angles of the vehicle at the reversing position based on the width of the vehicle passage.

DETAILED DESCRIPTION OF THE EMBODIMENTS

First Embodiment

Next, an embodiment of the present invention is described in detail with reference to the drawings.

Figure 1:
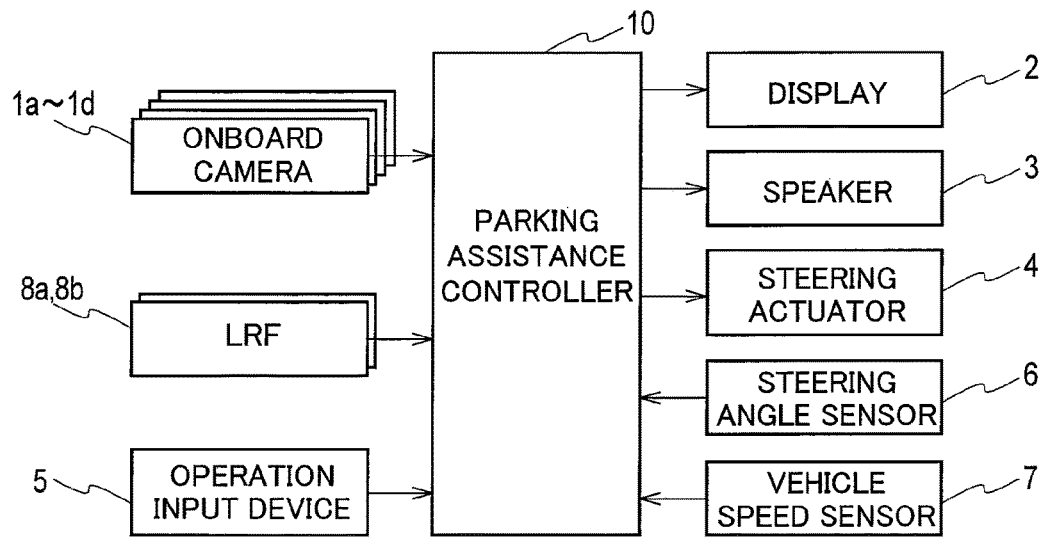
FIG. 1 is a block diagram illustrating a configuration of a parking assistance device according to a first embodiment.

A configuration of a parking assistance device according to a first embodiment is described with reference to FIG. 1. The parking assistance device is mounted in a vehicle, and calculates a route along which the vehicle is to travel from a parking start position (for example, a current position) to a parkable area to guide the vehicle along this route. Specifically, the parking assistance device guides the vehicle by automatically controlling a steering operation of the vehicle. As illustrated in FIG. 1, the parking assistance device includes a parking assistance controller 10, four onboard cameras 1a to 1d which capture videos of an area around the vehicle, laser rangefinders (LRFs) 8a, 8b which detect obstacles around the vehicle, a display 2, a speaker 3 which outputs guidance audio, a steering actuator 4 which drives a steering of the vehicle, an operation input device 5 which receives operation inputs made by a driver of the vehicle, a steering angle sensor 6 which detects the steering angle of the vehicle, and a vehicle speed sensor 7 which detects the vehicle speed of the vehicle.

Figure 2:
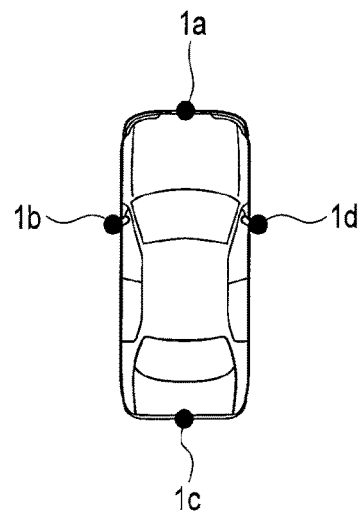
FIG. 2 is a top view illustrating an example of how onboard cameras 1a to 1d are mounted in a vehicle.

The onboard cameras 1a to 1d are CCD cameras or CMOS cameras which each have an angle of view of, for example, about 180 degrees. The four onboard cameras 1a to 1d are mounted at appropriate portions of the vehicle to capture videos of an entire region surrounding the vehicle. Specifically, as illustrated in for example FIG. 2, the onboard camera 1a is attached to a front grill of the vehicle, the onboard camera 1b is attached to a left door mirror, the onboard camera 1c is attached to a rear finisher, and the onboard camera 1d is attached to a right door mirror, and the onboard cameras 1a to 1d each capture a video of a region of a predetermined range in the area around the vehicle.

The onboard cameras 1a to 1d continuously perform image capturing multiple times during travel of the vehicle and this enables measurement of a distance to each of obstacles (including other vehicles and walls) appearing in multiple videos and measurement of a direction in which the obstacle exists. Alternatively, the distance to the obstacle and the direction in which the obstacle exists may be measured by using two videos simultaneously captured by a pair of cameras (stereo camera). The onboard cameras 1a to 1d can determine, in addition to the obstacles, a parking spot which is an example of the parkable area by recognizing white lines drawn on a road surface. The white lines can be recognized by performing edge detection processing on the videos.

The laser range finders (LRFs) 8a, 8b emit infrared laser to each of the obstacles and can measure the distance to the obstacle and the direction in which the obstacle exists, based on the degree of reflection of the infrared laser. The field of view of the laser range finders 8a, 8b is 200 degrees or more. Each of the laser range finders 8a, 8b thus detects the distance from a left side surface or a right side surface of the vehicle to an obstacle existing in front of the vehicle. Note that a clearance sonar utilizing an ultrasonic wave can be given as another means for measuring the distance to each obstacle around the vehicle.

The display 2 is a display device such as a liquid crystal display installed in a vehicle cabin of the vehicle, and displays a bird's eye view of the area around the vehicle generated by the parking assistance controller 10 and various types of assistance information useful in the case where the driver performs driving operations in parking. An audio speaker generally mounted in the vehicle or the like is used as the speaker 3 and the speaker 3 outputs various types of guidance audio for parking assistance.

For example, the display 2 can display a symbol indicating a current position of the vehicle, frame symbols indicating a target parking position and a reversing position, and information instructing a steering angle of the steering at each of the current position of the vehicle and the reversing position. The speaker 3 can provide audio guidance instructing a direction to which the steering wheel is to be steered so that the vehicle can move along the route. This allows finer parking assistance.

The steering actuator 4 is controlled by the parking assistance controller 10 and drives the steering of the vehicle. For example, a steering drive motor of an electronic power steering (EPS) device which electrically assists the steering operation by the driver or a similar device is used as the steering actuator 4. The parking assistance controller 10 automatically controls the steering operation of the vehicle such that the vehicle can move along the route. This automatic steering control can reduce an operational burden of the driver in the parking operation.

The operation input device 5 receives various types of operation inputs made by the driver of the vehicle and includes, for example, a direction key, a touch panel, and the like. When an operation is made by the driver, the operation input device 5 inputs an operation signal corresponding to this operation input, into the parking assistance controller 10. For example, the operation input device 5 receives the target parking position and the attitude angle of the vehicle at the target parking position which are inputted by the driver. Moreover, the steering angle sensor 6 and the vehicle speed sensor 7 input information on the steering angle of the vehicle and the vehicle speed into the parking assistance controller 10 as necessary.

The parking assistance controller 10 consists of a microcontroller including, for example, a CPU, a memory, and an input-output unit, and implements multiple information processing circuits included in the parking assistance device by executing a computer program installed in advance. The parking assistance controller 10 executes a series of information processing cycles in each of which the route to the parking spot is calculated. The parking assistance controller 10 may serve also as an electronic control unit (ECU) used for other controls related to the vehicle.

Figure 3A:
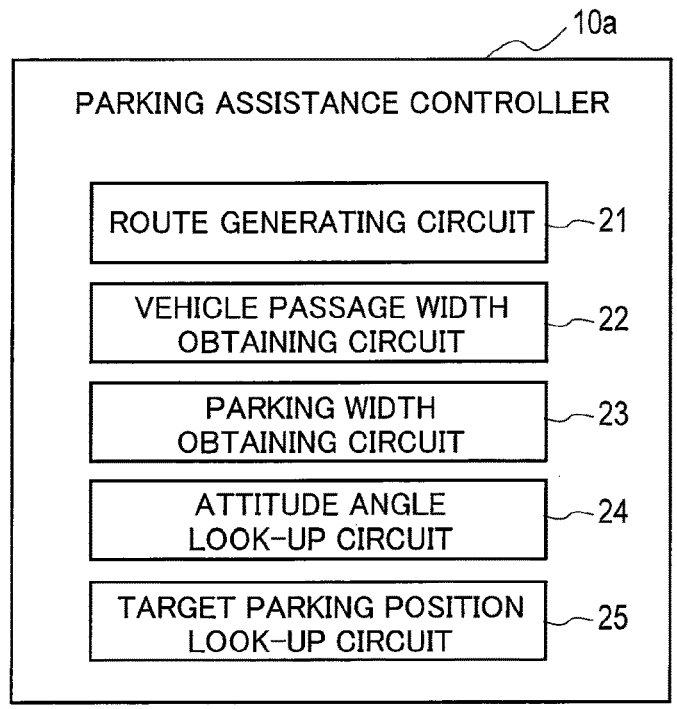
FIG. 3A is a block diagram illustrating multiple information processing circuits implemented by a parking assistance controller 10a according to the first embodiment and FIG. 3B is a block diagram illustrating multiple information processing circuits implemented by a parking assistance controller 10b according to a second embodiment.
Figure 3B:
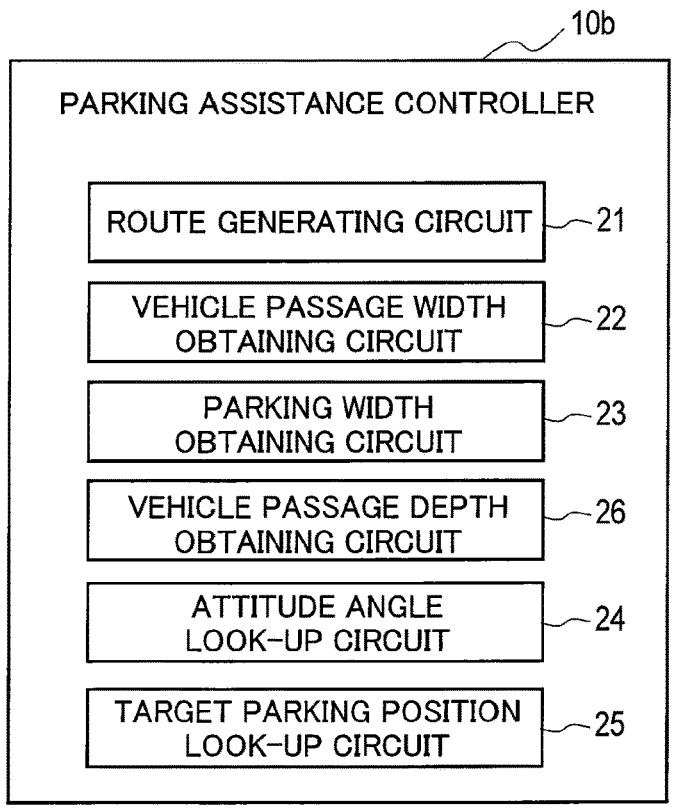

As illustrated in FIGS. 3A and 3B, the multiple information processing circuits implemented by the parking assistance controller 10 include a route generating circuit 21, a vehicle passage width obtaining circuit 22, a parking width obtaining circuit 23, an attitude angle look-up circuit 24, and a target parking position look-up circuit 25.

Figure 4:
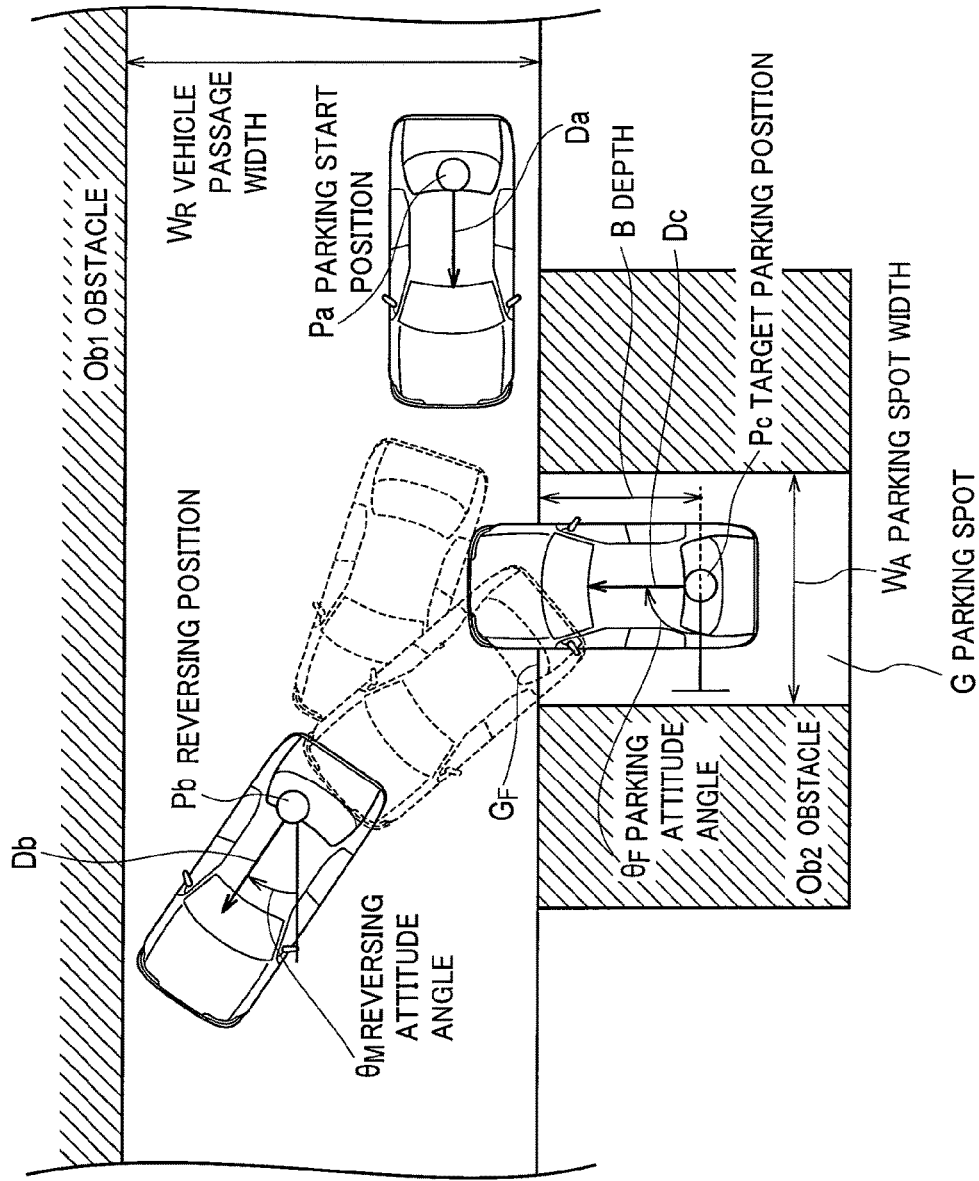
FIG. 4 is a top view describing definitions of major terms in the first embodiment.

As illustrated in FIG. 4, the route generating circuit 21 generates the route along which the vehicle is to travel from the parking start position (Pa), via the reversing position (Pb), to the parking spot (G) where the vehicle is to be parked. Specifically, the route generating circuit 21 generates a so-called "one-time reversing parking route" in which the vehicle is to travel forward from the parking start position (Pa) to the reversing position (Pb) and then be steered in the opposite direction to travel in reverse to the target parking position (Pc) set in the parking spot (G).

The route generating circuit 21 sets the target parking position and the attitude angle at the target parking position while using the vehicle at the start of parking as a reference. For example, the route generating circuit 21 sets the vehicle position at the start of the parking assistance as the parking start position (Pa) and sets the target parking position (Pc) relative to the parking start position (Pa). Specifically, the route generating circuit 21 sets the target parking position (Pc) in a coordinate system whose original point is the parking start position (Pa). Furthermore, for example, the route generating circuit 21 sets an angle between a travel direction (Dc) of the vehicle at the target parking position (Pc) and a travel direction (Da) of the vehicle at the parking start position (Pa), that is the attitude angle ($\theta_F$) at the completion of parking. Note that, in the embodiment, the "attitude angle ($\theta$)" is an angle relative to the travel direction of the vehicle at the start of parking. However, the attitude angle is not limited to the angle relative to the travel direction of the vehicle at the start of parking. Alternatively, the attitude angle may be an angle relative to an obstacle ($Ob_1$) adjacent to the vehicle passage in a width direction thereof or an angle relative to an obstacle ($Ob_2$) adjacent to the parkable area in a width direction thereof. Note that an intermediate position between the two rear wheels is given as an example of each of the parking start position, the target parking position, and the reversing position (described later).

The route generating circuit 21 receives signals outputted from various sensors including the onboard cameras 1*a* to 1*d*, the laser range finders (LRFs) 8*a*, 8*b*, and the clearance sonar as described above. The route generating circuit 21 thereby recognizes the positions and directions of the obstacles (including other vehicles and walls) and white lines around the vehicle, detects the parkable area, and determines the target parking position and the attitude angle at the target parking position in the parking of the vehicle at the parkable area. Note that information on the recognized obstacles and white lines are recorded in the ECU as map information. Alternatively, the route generating circuit 21 may obtain information from an infrastructure which provides information on an open parkable space and determine the target parking position and the attitude angle at the target parking position. As another alternative, the route generating circuit 21 may display an image captured by the onboard cameras and determine the target parking position and the attitude angle at the target parking position based on the position and direction specified by the driver in the displayed image.

Next, the route generating circuit 21 generates the one-time reversing parking route based on the target parking position, the attitude angle at the target parking position, and the attitude angle ($\theta_M$) at the reversing position (Pb), by using an "one-time reversing base algorithm." The "one-time reversing base algorithm" is described later with reference to FIGS. 8 to 14. By generating the route, the route generating circuit 21 can simultaneously determine the reversing position (Pb) illustrated in FIG. 4.

The vehicle passage width obtaining circuit 22 calculates the width (WR) of the "vehicle passage" illustrated in FIG. 4, based on the positions and directions of the obstacles (including other vehicles and walls) and white lines around the vehicle which are recognized by the route generating circuit 21. The "vehicle passage" is a region which the parkable area (for example, the parking spot G) faces and is a vehicle travelable region. The vehicle passage width obtaining circuit 22 can calculate the width (WR) of the vehicle travelable region (vehicle passage) based on the positions and directions of the obstacles (including other vehicles and walls) and white lines around the vehicle. As a matter of course, the vehicle passage width obtaining circuit 22 may obtain information on the width of the vehicle passage from the infrastructure together with information on an open parking space.

The parking width obtaining circuit 23 calculates the width of the parkable area detected by the route generating circuit 21. As a matter of course, the width of the parkable area may be obtained from the outside like the vehicle passage width (WR) or set to a value inputted by the driver. Here, the parking spot width (WA) illustrated in FIG. 4 is used as an example of the width of the parkable area.

As illustrated in FIG. 4, the attitude angle look-up circuit 24 looks up the attitude angles ($\theta_M$) of the vehicle at the reversing position (Pb), based on the vehicle passage width (WR). In this case, the attitude angle look-up circuit 24 looks up the attitude angles ($\theta_M$) to enable generation of the route in which a front portion of the vehicle will not interfere at the reversing position (Pb) with the obstacle ($Ob_1$) adjacent to the vehicle passage in the width direction thereof.

The attitude angle look-up circuit 24 sets the attitude angle ($\theta_M$) of the vehicle at the reversing position (Pb) to a certain attitude angle ($\theta_M$), and then determines whether the front portion of the vehicle will interfere with the obstacle ($Ob_1$) at the reversing position (Pb) in the route generated based on the set attitude angle ($\theta_M$). When determining that the front portion will interfere, the attitude angle look-up circuit 24 changes the attitude angle ($\theta_M$) of the vehicle at the reversing position (Pb). The attitude angle look-up circuit 24 determines whether the front portion of the vehicle will interfere with the obstacle adjacent to the vehicle passage in the width direction thereof, at the reversing position (Pb) in the route generated based on the changed attitude angle ($\theta_M$). The changing of the attitude angle ($\theta_M$) and the generation of the route are repeated until the attitude angle look-up circuit 24 determines that no interference will occur. The attitude angle look-up circuit 24 thereby looks up the attitude angles ($\theta_M$) to enable generation of the route in which the vehicle will not interfere with the obstacle.

The smaller the vehicle passage width (WR) is, the smaller the attitude angle ($\theta_M$) tends to be at the reversing position (Pb). Accordingly, the attitude angle look-up circuit 24 starts the look-up of the attitude angles ($\theta_M$) from the attitude angle ($\theta_F$) at the completion of parking, and then performs the look-up in a descending order starting from the attitude angle ($\theta_F$). Specifically, when determining that interference will occur, the attitude angle look-up circuit 24 decrements the attitude angle ($\theta_M$) of the vehicle at the reversing position (Pb) and sets the decremented angle as the new attitude angle ($\theta_M$). Then, the attitude angle look-up circuit 24 selects the largest attitude angle ($\theta_M$) from the attitude angles which enable generation of the routes in which the vehicle will not interfere with the obstacle ($Ob_1$) at the reversing position (Pb). Selecting the largest attitude angle enables generation of the route in which the vehicle is less likely to interfere with the obstacle ($Ob_2$) in a section from the reversing position (Pb) to the target parking position (Pc).

The target parking position look-up circuit 25 looks up the target parking positions (Pc) in the parking spot (G) based on the vehicle passage width (WR) to enable generation of the route in which the front portion of the vehicle will not interfere at the reversing position (Pb) with the obstacle ($Ob_1$) adjacent to the vehicle passage in the width direction thereof.

The target parking position look-up circuit 25 sets the target parking positions (Pc) in the parking spot (G) to a certain target parking positions (Pc), and then determines whether the front portion of the vehicle will interfere with the obstacle ($Ob_1$) at the reversing position (Pb) in the route generated based on the set target parking position (Pc). When determining that interference will occur, the target parking position look-up circuit 25 changes the target parking position (Pc) in the parking spot (G). The target parking position look-up circuit 25 determines whether the front portion of the vehicle will interfere with the obstacle adjacent to the vehicle passage in the width direction thereof, at the reversing position (Pb) in the route generated based on the changed target parking position (Pc). The changing of the target parking position (Pc) and the generation of the route are repeated until the target parking position look-up circuit 25 determines that no interference will occur. The target parking position look-up circuit 25 thereby looks up the target parking positions (Pc) to enable generation of the route in which the vehicle will not interfere with the obstacle.

As illustrated in FIG. 4, the larger the distance (depth B) from an end ($G_F$) of the parking spot (G) on a vehicle entrance side to the target parking position (Pc) is, the more likely that the vehicle will interfere with the obstacle (Ob$_2$) around the parking spot (G) in reverse travel. Accordingly, the target parking position look-up circuit 25 starts the look-up of the target parking positions (Pc) from the end (G$_F$) of the parking spot (G) on the vehicle entrance side. Specifically, the generation of the route is started with the depth (B) being set to zero, and the target parking position look-up circuit 25 looks up the depths (B) in the ascending order. To be more specific, when determining that interference will occur, the target parking position look-up circuit 25 moves the target parking position (Pc) in a vehicle entering direction and sets the moved position as the new target parking position (Pc). Then, the target parking position look-up circuit 25 selects the target parking position (Pc) with the smallest depth (B) from the target parking positions (Pc) which enable generation of the routes in which the vehicle will not interfere with the obstacle (Ob$_1$) at the reversing position (Pb). The route in which the vehicle is less likely to interfere with the obstacle (Ob$_2$) in the section from the reversing position (Pb) to the target parking position (Pc) can be thereby generated.

As described above, the parking assistance device measures the vehicle travelable area including the parkable area (parking spot G) and the vehicle passage width (WR). Then, the parking assistance device repeatedly performs the route generation, the interference determination, and the parameter (attitude angle ($\theta_M$), target parking position (Pc)) adjustment to obtain a route suitable for the travelable area.

Next, an example of a method of generating the "one-time reversing parking route" which is performed by the parking assistance device of FIG. 1 is described with reference to FIGS. 5 to 7.

In step S01, the route along which the vehicle (Vc1) is to travel from the parking start position (Pa), via the reversing position (Pb), to the parking spot (G) where the vehicle is to be parked is generated by using the "one-time reversing base algorithm." In the first cycle, the attitude angle ($\theta_{M1}$) at the reversing position (Pb1) is set to the attitude angle ($\theta_F$) at the completion of parking, and the target parking position (Pc1) is set to the end (G$_F$) of the parking spot (G) on the vehicle passage side. The details of step S01 are described later with reference to FIGS. 8 to 14.

Proceeding to step S03, the parking assistance controller 10a determines whether the front portion of the vehicle will interfere with the obstacle (Ob$_1$) adjacent to the vehicle passage, at the reversing position (Pb$_1$) in the generated route. Specifically, as illustrated in FIG. 6, the parking assistance controller 10a determines whether a right front portion of the vehicle will move outside the vehicle passage (travelable area) and interfere with the obstacle (Ob$_1$) at the reversing position (Pb$_1$)(K$_1$). When the right front portion will not interfere (NO in S03), the processing proceeds to step S13. When right front portion will interfere (YES in S03), the processing proceeds to step S05.

In step S05, the parking assistance controller 10a determines whether the attitude angle ($\theta_M$) can be decremented. When the current attitude angle ($\theta_M$) is already the minimum value (for example, zero), the decrement cannot be performed. When the attitude angle ($\theta_M$) can be decremented (NO in S05), the parking assistance controller 10a decrements the attitude angle ($\theta_{Mn}$) in step S07 and returns to step S01 to generate the route again by using the decremented attitude angle ($\theta_{Mn}$) at the reversing position (Pbn) of vehicle (Vcn).

When the attitude angle ($\theta_M$) cannot be decremented (YES in S05), the parking assistance controller 10a determines whether the depth (B) can be incremented (S09). The target parking position (Pc) which causes the vehicle to be located outside the parking spot (G) cannot be set. When the depth (B) can be incremented (NO in step S09), the parking assistance controller 10a increments the depth (B) in step S11. In this case, the attitude angle ($\theta_M$) is reset to an initial value, that is the parking attitude angle ($\theta_F$). Then, returning to step S01, the route is generated again by using the new target parking position (Pc). As described above, the parking assistance controller 10a first searches for the route in which no interference will occur while scanning the attitude angles ($\theta_M$) in the descending order starting from the initial value. Then, when the attitude angle ($\theta_M$) reaches its limit, the parking assistance controller 10a changes the target parking position (Pcm) and performs the scanning of the attitude angle ($\theta_M$) from the initial value again.

When the route in which no interference will occur is generated before both of the attitude angle ($\theta_M$) and the target parking position (Pcm1) reach their limits (NO in S03), the processing can proceed to step S13. Meanwhile, when both of the attitude angle ($\theta_M$) and the target parking position (Pcmk) reach their limits (YES in step S09), the parking assistance controller 10a determines that the generation of the one-time reversing route is difficult and abandons the route generation.

Figure 7:
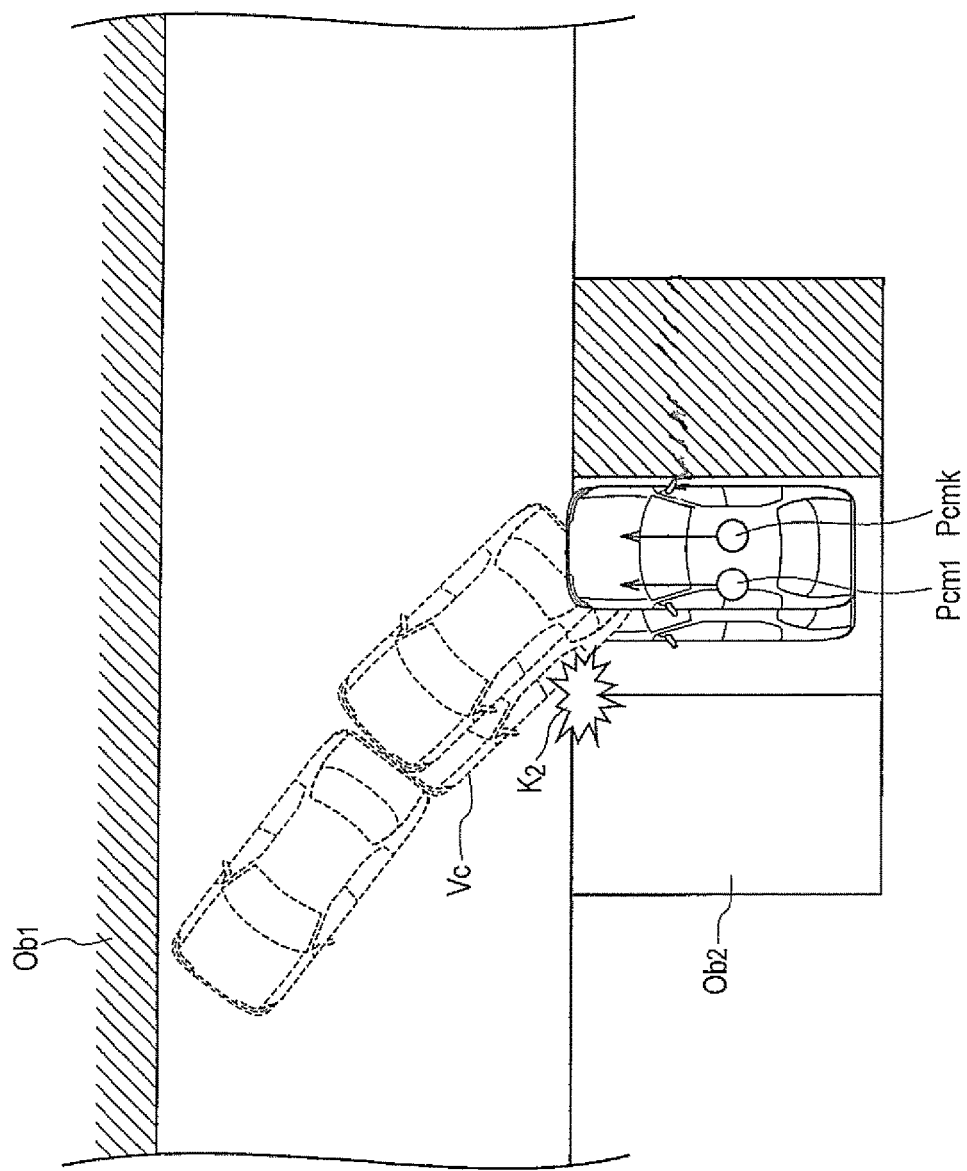
FIG. 7 is a view for explaining step (S13) of determining interference between the vehicle and an obstacle ($Ob_2$) in a section from the reversing position (Pb) to a target parking position (Pc)

In step S13, the parking assistance controller 10a determines whether the vehicle will interfere with the obstacle (Ob$_2$) in the section from the reversing position (Pb) to the target parking position (Pc) as illustrated in FIG. 7 (K$_2$). When the vehicle will interfere with the obstacle (Ob$_2$) (YES in S13), the parking assistance controller 10a moves the target parking position (Pc) in a parking spot width direction (step S19), within a range of the parking spot (G) (NO in S17). Then, returning to step S01, the parking assistance controller 10a generates the route again by using the moved target parking position (Pc). In this case, the attitude angle ($\theta_M$) is reset to the attitude angle ($\theta_F$) at the completion of parking. Similarly, the depth (B) of the target parking position (Pc) is also reset to zero.

When the target parking position (Pc) cannot be moved in the parking spot width direction within the range of the parking spot (G) (YES in S17), the processing proceeds to step S21.

When the vehicle will not interfere with the obstacle (Ob$_2$) (NO in S13), the processing proceeds to step S15, and the route generated in this cycle is adopted as the route suitable for the travelable area.

Figure 5:
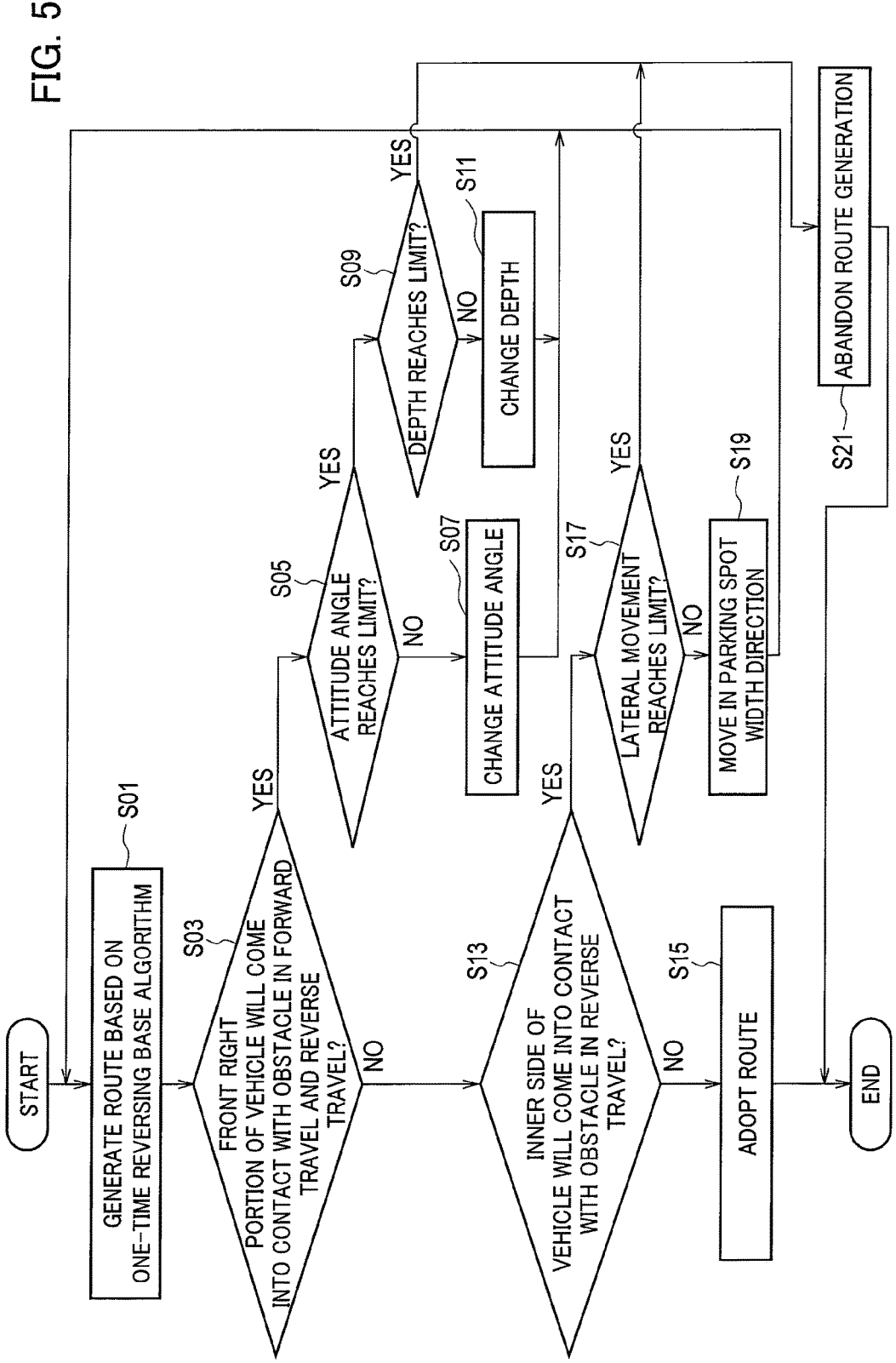
FIG. 5 is a flowchart illustrating an example of a method of generating a "one-time reversing parking route" which is performed by the parking assistance device of FIG. 1.
Figure 6:
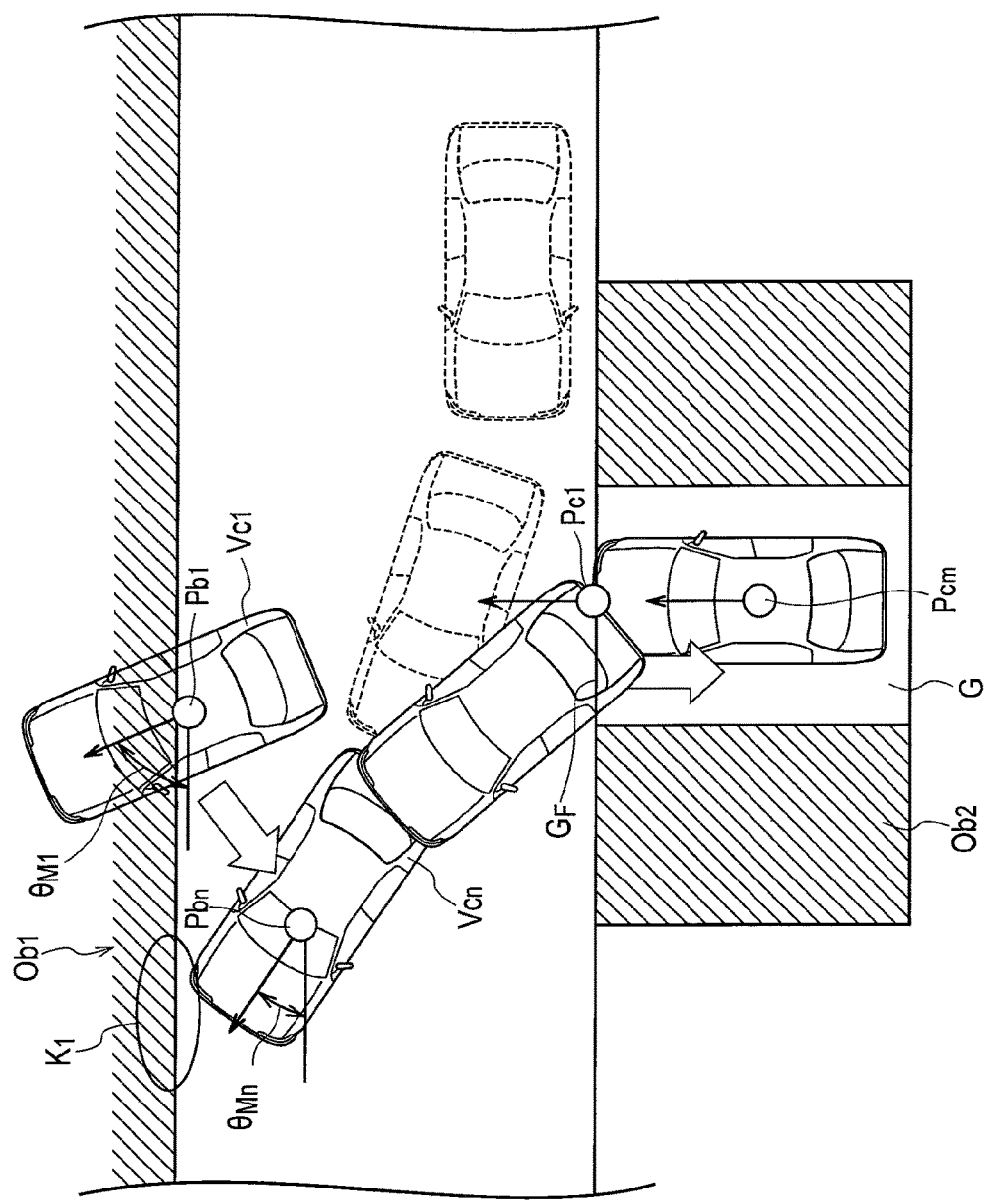
FIG. 6 is a view for explaining step (S03) of determining interference between a front right portion of the vehicle and an obstacle ($Ob_1$) at a reversing position (Pb)
Figure 8:
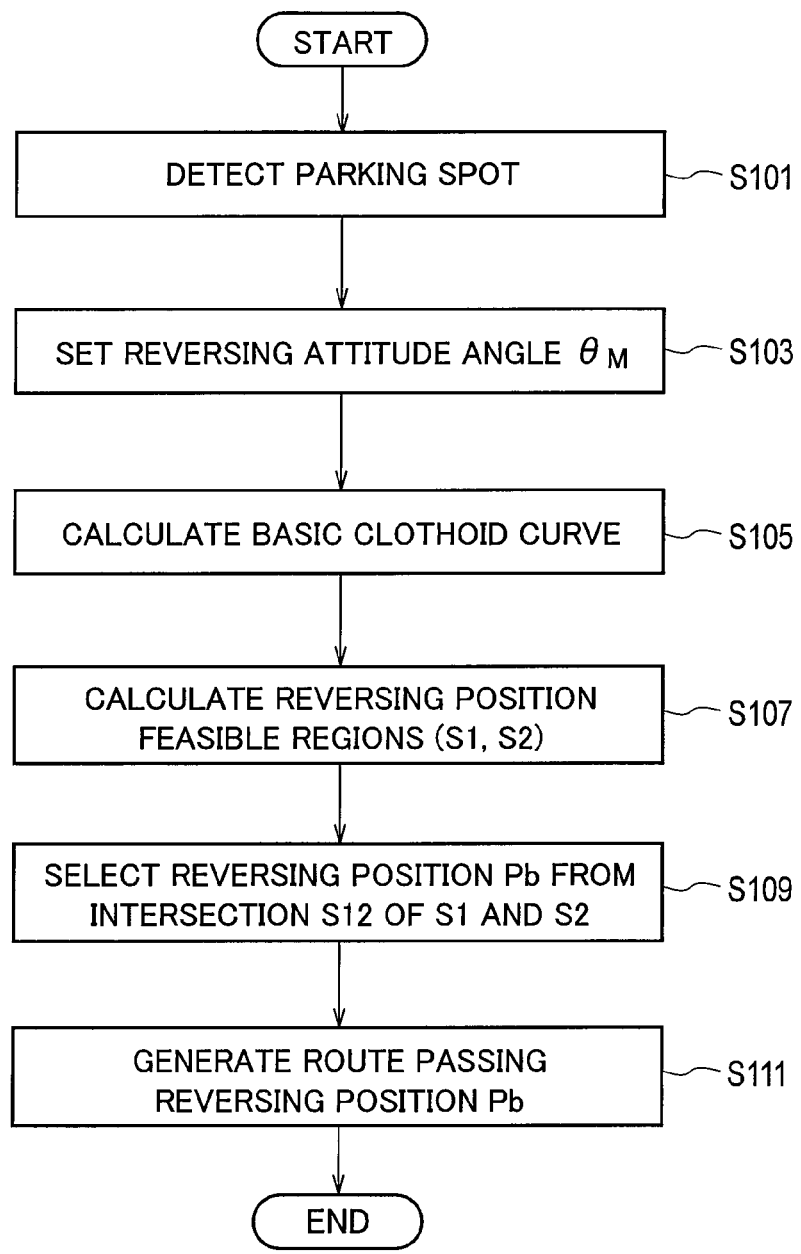
FIG. 8 is a flowchart illustrating an example of detailed procedures in step S01 of FIG. 5.

An example of detailed procedures in step S01 of FIG. 5 is described with reference to FIG. 8. In step S101, the route generating circuit 21 detects the parkable area (including the parking spot G) from the positions and directions of the obstacles (including other vehicles and walls) and white lines around the vehicle, and determines the target parking position (Pc) and the attitude angle ($\theta_F$) at the target parking position (Pc) in the parking of the vehicle in this parkable area.

Proceeding to step S103, the route generating circuit 21 sets the attitude angle ($\theta_M$) at the reversing position (Pb). In the first cycle, the route generating circuit 21 sets the attitude angle ($\theta_M$) to the attitude angle ($\theta_F$) and, in the second cycle and beyond, changes or resets the attitude angle ($\theta_M$) depending on the instruction in step S07, S11, or S19.

Proceeding to step S105, the route generating circuit 21 calculates a basic clothoid curve based on the target parking position (Pc), the attitude angle ($\theta_F$), and the attitude angle ($\theta_M$). A method of calculating the basic clothoid curve is described with reference to FIGS. 9 to 13.

Figure 9:
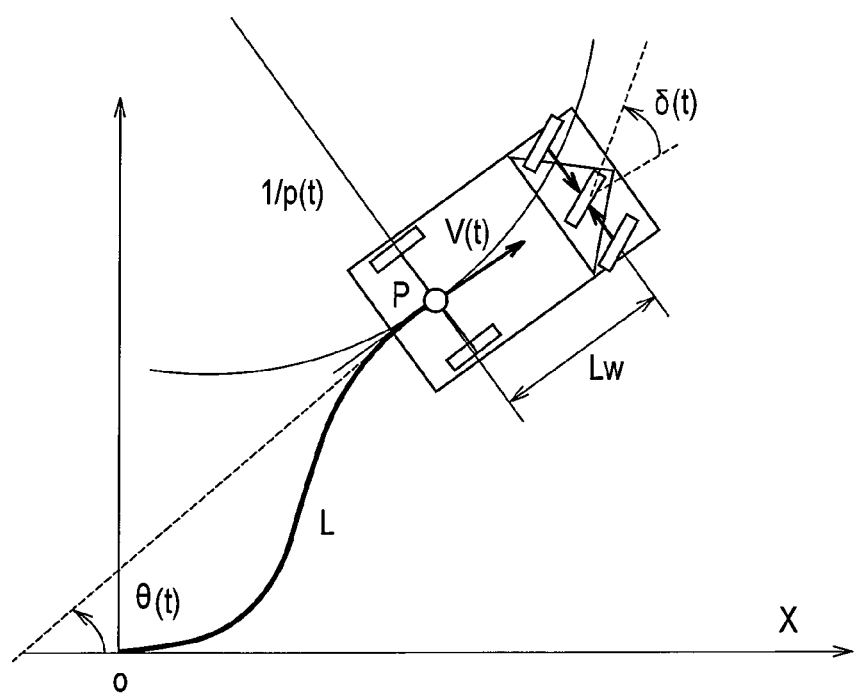
FIG. 9 is a view illustrating a vehicle model of Ackermann-Jeantaud.

[Very-low Speed Vehicle Model] It is known that a vehicle model of Ackermann-Jeantaud is useful in analysis of a vehicle traveling at very-low speed travel such as in parking in which no sideslip of the wheels occurs. FIG. 9 illustrates this vehicle model. In FIG. 9, Lw [m] denotes a wheel base, δ(t) [rad] denotes a front wheel steering angle, V(t) [m/s] denotes a vehicle speed at a rear wheel axle center (P), θ(t) [rad] denotes the attitude angle of the vehicle, and ρ(t) denotes a curvature of a trajectory along which the rear wheel axle center (P) has traveled. A differential equation of the rear wheel axel center (P) for the time (t) is expressed by formula (1).

[Math 1]

$$\begin{cases} \dfrac{dx}{dt} = V(t)\cos\theta(t) \\ \dfrac{dy}{dt} = V(t)\sin\theta(t) \\ \dfrac{d\theta}{dt} = \dfrac{V(t)}{Lw}\tan\delta(t) \end{cases} \quad (1)$$

A time derivative of a unit distance is expressed by formula (2). Accordingly, formula (3) is obtained by rewriting formula (1) to a differential equation for a travel distance (L).

[Math 2]

$$\frac{dL}{dt} = \sqrt{\left(\frac{dx}{dt}\right)^2 + \left(\frac{dy}{dt}\right)^2} = \sqrt{V^2(t)\cos^2\delta(t)(\cos^2\theta + \sin^2\theta)} = V\cos\delta(t) \quad (2)$$

[Math 3]

$$\begin{cases} \dfrac{dx}{dL} = \cos\theta(t) \\ \dfrac{dy}{dL} = \sin\theta(t) \\ \dfrac{d\theta}{dL} = \dfrac{\tan\delta(t)}{Lw} \end{cases} \quad (3)$$

Figure 10A:
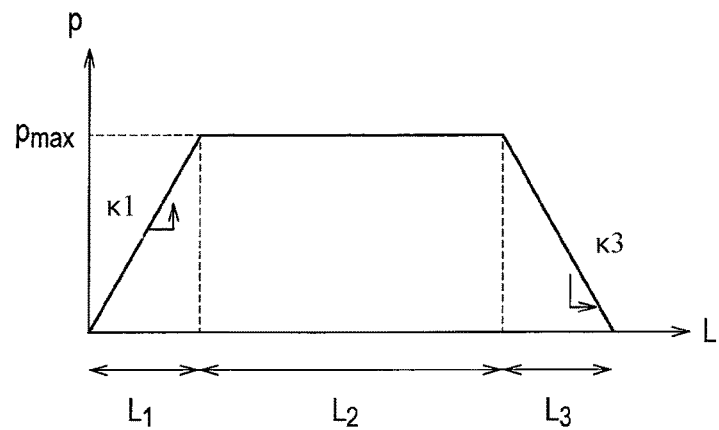
FIGS. 10A and 10B include graphs illustrating relationships between the curvature ($\rho$) of a clothoid curve and a travel trajectory, and depicts the case where tires are steered to the maximum curvature ($\rho_{max}$) corresponding to the minimum turning radius of the vehicle.
Figure 10B:
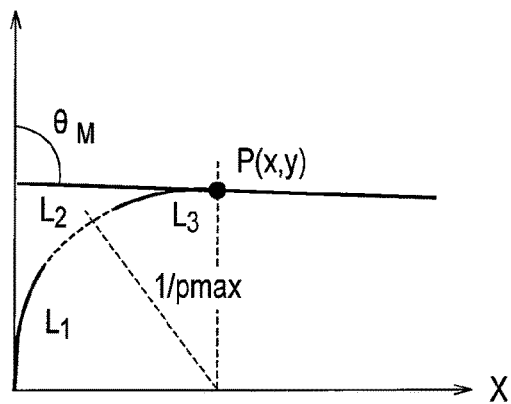
Figure 11A:
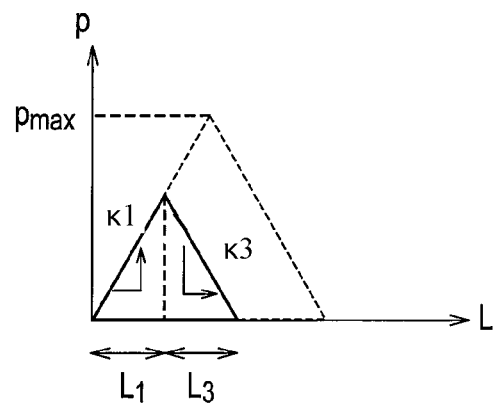
FIGS. 11A and 11B include graphs illustrating relationships between the curvature ($\rho$) of the clothoid curve and the travel trajectory, and depicts the case where the tires are not steered to the maximum curvature ($\mu$max)
Figure 11B:
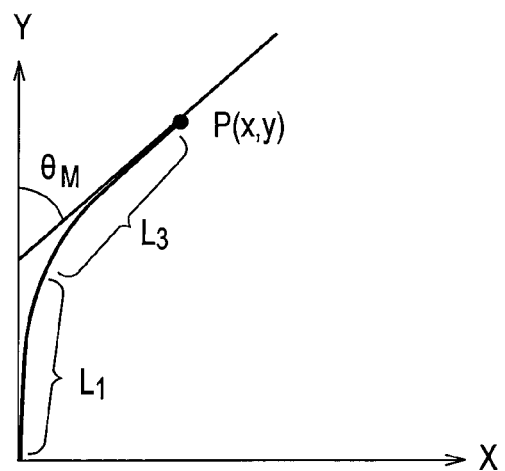

[Clothoid Curve]
When the vehicle travels at the constant vehicle speed and the constant steering angle of the steering wheel, the trajectory of the vehicle forms a clothoid curve. In a steering pattern in which a tire steering angle is 0 [rad] at a start point and an end point of a target trajectory, steering in a stationary state can be avoided and this is effective from the view point of reducing wear of the tires and load on an actuator. Relationships between the curvature (ρ) and the travel trajectory in this steering pattern are illustrated in FIGS. 10A and 10B and 11A and 11B. FIGS. 10A and 10B illustrate a case where the tires are steered to the maximum curvature ($\rho_{max}$) corresponding to the minimum turning radius of the vehicle. FIGS. 11A and 11B illustrate a case where the tires are not steered to the maximum curvature ($\rho_{max}$). L(=L1, L2, L3) denotes the travel distance and κ (=κ1, κ3) denotes a curvature change rate. In FIG. 10A and FIG. 11A, since the steering angle speed of the steering wheel is constant in travel trajectories (L1 and L3), the travel trajectories (L1 and L3) each form a clothoid curve. In FIG. 10A, since the steering angle of the steering wheel is constant, that is, the angular velocity is zero in a travel trajectory (L2), the travel trajectory (L2) forms an arc.

The curvature (ρ) is expressed by formula (4). Accordingly, when the curvature change rate (k) and the maximum curvature (ρmax) are determined and the target attitude angle (θ) is set, a unique change pattern of the curvature (p) is determined. Moreover, the relationship between the curvature (ρ) and the front wheel steering angle (δ) is a one-to-one relationship. Thus, when the target attitude angle (θ) is set, a unique front wheel steering angle (δ) is determined.

[Math 4]

$$\rho = \frac{d\theta}{dL} \quad (4)$$

[Range in which End Point of Trajectory Forming Clothoid Curve can Fall] Assume a case where the route connecting the parking start position (Pa) and the reversing position (Pb) is obtained by using the clothoid curve. When the attitude angle ($\theta_M$) at the reversing position (Pb) is set, a unique travel trajectory along which the vehicle travels until it is tilted by the attitude angle ($\theta_M$) relative to the travel direction of the vehicle at the parking start position (Pa) can be expressed by using the clothoid curve.

Figure 12:
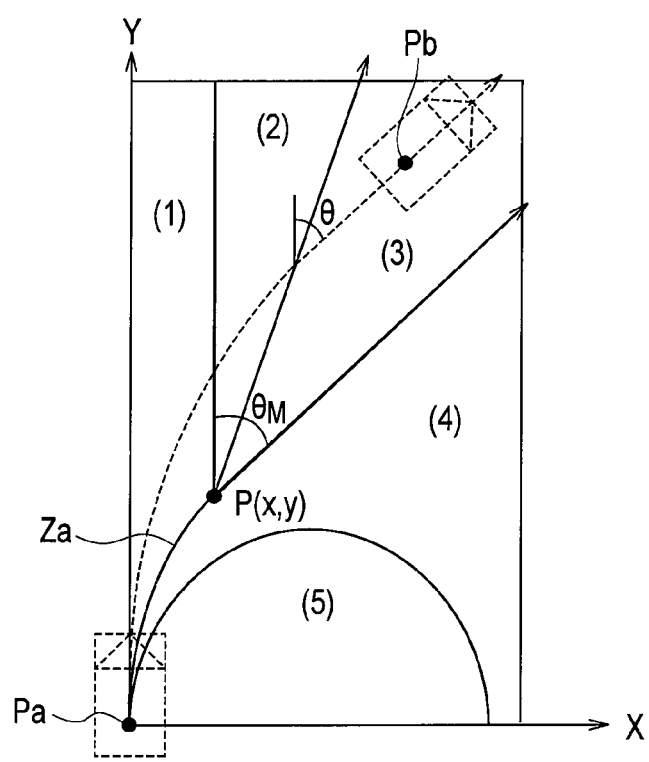
FIG. 12 is a graph depicting a range in which an end point of a trajectory forming the clothoid curve can fall.

As illustrated in FIG. 12, this travel trajectory is referred to as a basic clothoid curve (Za). The basic clothoid curve (Za) may be enlarged to a similar curve or a straight line may be added subsequent to the start point (Pa) or prior to the end point (Pb). The clothoid curve which forms the attitude angle ($\theta_M$) can be thereby drawn in the regions (2) and (3) illustrated in FIG. 12. Meanwhile, in the other regions (1), (4), and (5), no clothoid curve which forms the attitude angle ($\theta_M$) can be drawn. In other words, the reversing position (Pb) can be set in the regions (2) and (3) but cannot be set in the regions (1), (4), and (5).

Note that the region (2) is a region which the vehicle can reach by first traveling straight from the parking start position (Pa) and then drawing the clothoid curve. The region (3) is a region which the vehicle can reach by first drawing the clothoid curve from the parking start position (Pa) and then traveling straight.

Figure 13:
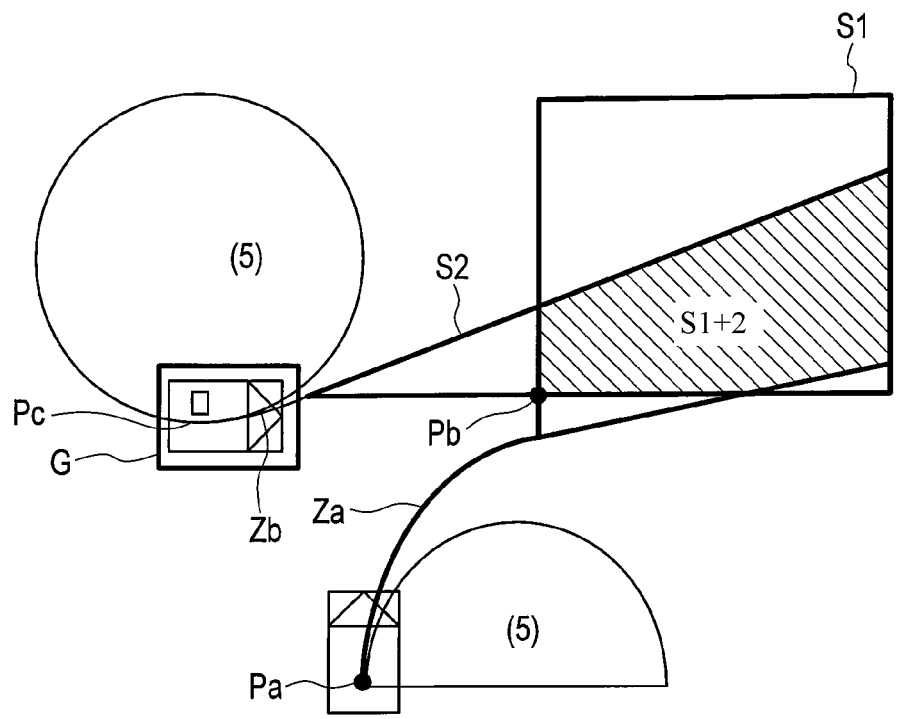
FIG. 13 is a diagram illustrating a basic clothoid curve (Za) whose start point is at the parking start position (Pa) and a basic clothoid curve (Zb) whose start point is at the target parking position (Pc)

FIG. 13 illustrates the basic clothoid curve (Za) whose start point is at the parking start position (Pa), and the region (S1) corresponds to the regions (2) and (3) illustrated in FIG. 12. A basic clothoid curve (Zb) extending from the target parking position (Pc) and forming an angle ($\theta_F$-$\theta_M$) obtained by subtracting the attitude angle ($\theta_M$) from the attitude angle ($\theta_F$) can be similarly calculated. The region (2) indicates a region in which the clothoid curve extending from the target parking position (Pc) and forming the angle ($\theta_F$-$\theta_M$) can be drawn.

Returning to FIG. 8, in step S105, the route generating circuit 21 calculates the basic clothoid curve (Za) whose start point is at the parking start position (Pa) and the basic clothoid curve (Zb) whose start point is at the target parking position (Pc). Proceeding to step S107, the route generating circuit 21 calculates the regions (S1, S2) illustrated in FIG. 13.

Proceeding to step S109, the route generating circuit 21 extracts a region (S1+2) where the region (S1) and the region (S2) overlap each other. Then, as illustrated in FIG. 13, the route generating circuit 21 selects such a position in the region (S1+2) that the shortest clothoid curve whose start point is at the parking start position (Pa) and the shortest clothoid curve whose start point is at the target parking position (Pc) are obtained, as the reversing position (Pb).

Figure 14:
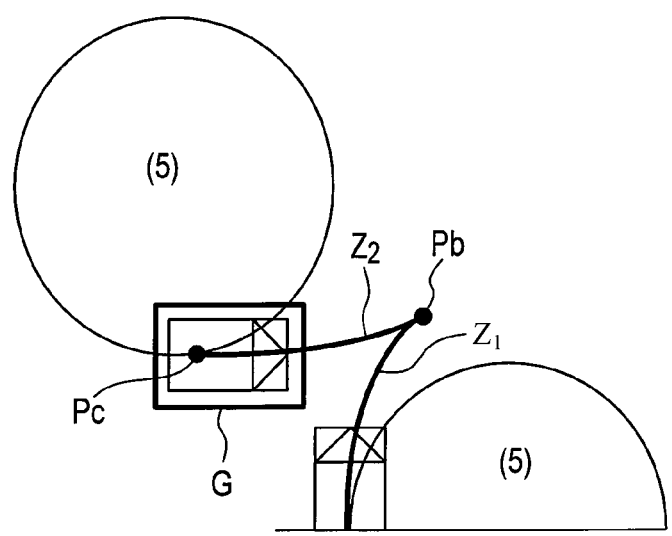
FIG. 14 is a diagram illustrating a clothoid curve ($Z_1$) from the parking start position (Pa) to the reversing position (Pb) and a clothoid curve ($Z_2$) from the reversing position (Pb) to the target parking position (Pc)

In step S111, as illustrated in FIG. 14, the route generating circuit 21 connects a clothoid curve ($Z_1$) from the parking start position (Pa) to the reversing position (Pb) and a clothoid curve ($Z_2$) from the reversing position (Pb) to the target parking position (Pc). The route is thereby completed.

In the first embodiment described above, the following operations and effects can be obtained.

The attitude angle look-up circuit 24 looks up the attitude angles ($\theta_M$) of the vehicle at the reversing position (Pb) based on the vehicle passage width (WR) to enable generation of the route in which the front portion of the vehicle will not interfere at the reversing position (Pb) with the obstacle ($Ob_1$) adjacent to the vehicle passage in the width direction thereof. The route in which the vehicle will not interfere with the obstacles ($Ob_1$, $Ob_2$) around the vehicle passage can be thereby generated also in an environment in which the vehicle passage width (WR) is small.

The attitude angle look-up circuit 24 selects the largest attitude angle from the attitude angles ($\theta_M$) of the vehicle which enable generation of the routes in which the front portion of the vehicle will not interfere at the reversing position (Pb) with the obstacle ($Ob_1$) adjacent to the vehicle passage in the width direction thereof. A route in which the vehicle is less likely to interfere with the obstacles beyond the reversing position can be thereby generated.

In the first embodiment, description is given of the case where the initial value (start attitude angle) of the attitude angle ($\theta_M$) is set to the attitude angle ($\theta_F$) at the completion of parking. However, the smaller the vehicle passage width (WR) is, the smaller the attitude angle ($\theta_M$) tends to be at the reversing position (Pb). Accordingly, in the case of the looking up the attitude angles ($\theta_M$) in the descending order starting from the initial value (start attitude angle), the initial value (start attitude angle) may be set such that the smaller the width (WR) is, the smaller the initial value (start attitude angle) is. This can reduce wasteful look-up time and achieve information processing load reduction and quick route calculation.

In some cases, the route in which the front portion of the vehicle will not interfere with the obstacle ($Ob_1$) at the reversing position (Pb) cannot be generated by looking up the attitude angles ($\theta_M$) (YES in S05). In this case, the attitude angle look-up circuit 24 moves the target parking position (Pc) in the vehicle entering direction from the end ($G_F$) of the parking spot (G) on the vehicle entrance side (S11). Then, the attitude angle look-up circuit 24 looks up the attitude angles ($\theta_M$) of the vehicle at the reversing position (Pb), based on the moved target parking position (Pc). An effect similar to that in the case where the vehicle passage width (WR) is increased can be obtained in the route generation by moving the target parking position (Pc) in the vehicle entering direction. The route in which the vehicle will not interfere with the obstacles around the vehicle passage can be thereby generated also in an environment in which the vehicle passage width (WR) is small.

Furthermore, the attitude angle look-up circuit 24 selects the target parking position (Pc) to which the movement amount (depth B) is the smallest in the vehicle entering direction, from the target parking positions (Pc) which enable generation of the routes in which the vehicle will not interfere with the obstacle ($Ob_2$) adjacent to the parking spot in the width direction thereof. The route in which the vehicle is less likely to interfere with the obstacle ($Ob_2$) in the section from the reversing position (Pb) to the target parking position (Pc) can be thereby generated.

In some cases, the route in which the vehicle will not interfere with the obstacle ($Ob_1$) at the reversing position (Pb) cannot be generated by moving the target parking position (Pc) in the vehicle entering direction from the end ($G_F$) of the parking spot (G) and by looking up the attitude angles ($\theta_M$) (YES in S09). In this case, the attitude angle look-up circuit 24 determines that the route along which the vehicle is to travel to the parking spot (G) via the reversing position (Pb) cannot be generated (S21). The parking assistance device can determine that it is difficult to generate the "one-time reversing parking route" by using the attitude angle ($\theta_M$) and the depth (B) of the target parking position (Pc) as variables. Accordingly, it is possible to start generation of a parking route in which a reversing is performed two or more times. Alternatively, the parking assistance device may actually move the vehicle to a point one step short of collision with the obstacle and then perform the route generation again.

The attitude angle look-up circuit 24 sets the attitude angle ($\theta_M$) of the vehicle at the reversing position (Pb) (S103). The parking assistance controller 10a determines whether the front portion of the vehicle will interfere with the obstacle ($Ob_1$) adjacent to the vehicle passage, at the reversing position (Pb) in the route generated based on the set attitude angle ($\theta_M$) (S03). When determining that the interference will occur (YES in S03), the parking assistance controller 10a changes the attitude angle ($\theta_M$) of the vehicle at the reversing position (S07), and determines whether the front portion of the vehicle will interfere with the obstacle adjacent to the vehicle passage in the width direction thereof, at the reversing position (Pb) in the route generated based on the changed attitude angle ($\theta_M$) (S03). The generation of the route, the determination of interference, and the changing of the attitude angle can be thereby repeatedly performed. Accordingly, it is possible to look up the attitude angles ($\theta_M$) and generate a route with no interference.

The target parking position look-up circuit 25 looks up the target parking positions (Pc) in the parking spot (G) based on the vehicle passage width (WR) to enable generation of the route in which the front portion of the vehicle will not interfere at the reversing position (Pb) with the obstacle ($Ob_1$) adjacent to the vehicle passage in the width direction thereof. The target parking positions (Pc) can be moved from one to another by looking up the target parking positions (Pc) based on the passage width (WR). An effect similar to that in the case where the vehicle passage width (WR) is increased can be thereby obtained in the route generation. The route in which the vehicle will not interfere with the obstacles around the vehicle passage can be thereby generated also in an environment in which the vehicle passage width is small.

Second Embodiment

In the first embodiment, description is given of the example of the parking assistance focusing on the width (WR) of the vehicle passage which the parking spot (G) faces. In a second embodiment, as illustrated in FIG. 15, description is given of a parking assistance device and method which generate a route in which the vehicle will not interfere with obstacles ($Ob_1$, $Ob_2$, $Ob_3$), in consideration of not only the vehicle passage width (WR) but also the depth of the vehicle passage (vehicle passage depth E).

The parking assistance device looks up the attitude angles ($\theta_M$) and the target parking positions (Pc) based on not only the vehicle passage width (WR) but also the vehicle passage depth (E). In this case, the parking assistance device looks up the attitude angles ($\theta_M$) and the target parking positions (Pc) to enable generation of the route in which the vehicle (Vc) will not interfere with the obstacles around the vehicle passage.

As illustrated in FIG. 3B, multiple information processing circuits implemented by a parking assistance controller 10b according to the second embodiment include, in addition to the circuits (21 to 25) illustrated in FIG. 3A, a vehicle passage depth obtaining circuit 26 which obtains the vehicle passage depth (E).

Figure 15:
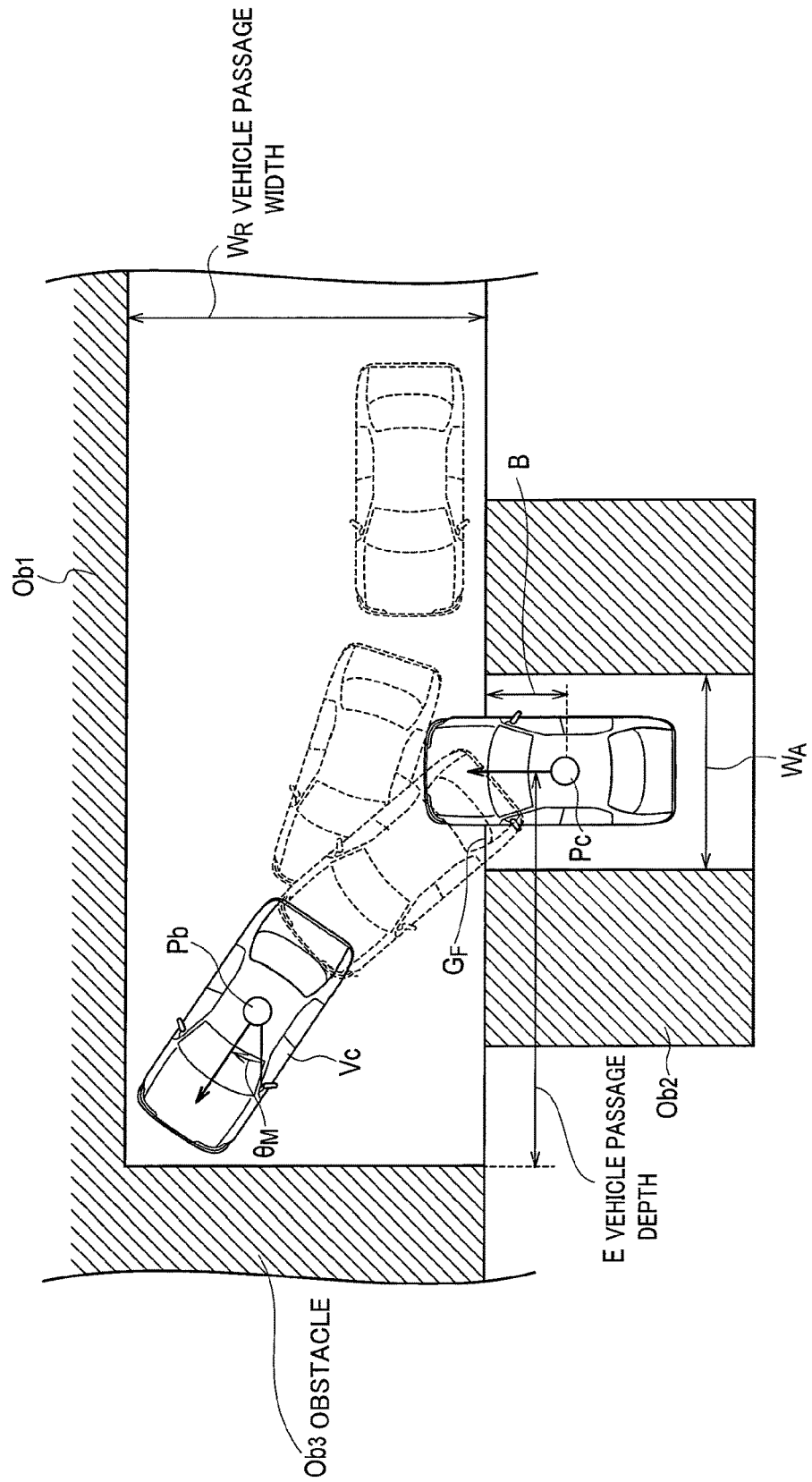
FIG. 15 is a top view describing definitions of major terms in the second embodiment.

The vehicle passage depth obtaining circuit 26 calculates the vehicle passage depth (E) illustrated in FIG. 15, based on the positions and directions of the obstacles (including other vehicles and walls) and white lines around the vehicle which are recognized by the route generating circuit 21. The "vehicle passage depth (E)" indicates the distance from the target parking position (Pc) to an end of the vehicle passage in a direction perpendicular to the vehicle passage width (WR). The vehicle passage depth obtaining circuit 26 obtains the positions and directions of the obstacles (including other vehicles and walls) and white lines around the vehicle from the route generating circuit 21. The vehicle passage depth obtaining circuit 26 can calculate the depth (E) of the vehicle travelable region (vehicle passage), based on the positions and directions of the obstacles (including other vehicles and walls) and white lines around the vehicle. As a matter of course, the vehicle passage depth obtaining circuit 26 may obtain information on the depth of the vehicle passage from the infrastructure, together with the information on an open parking space.

The attitude angle look-up circuit 24 looks up the attitude angles ($\theta_M$) of the vehicle at the reversing position (Pb) based on the vehicle passage width and the vehicle passage depth to enable generation of the route in which the front portion of the vehicle will not interfere at the reversing position (Pb) with the obstacles ($Ob_1$, $Ob_3$) adjacent to the vehicle passage in the width direction and the depth direction thereof.

The attitude angle look-up circuit 24 controls the scanning direction of the attitude angles ($\theta_M$) depending on the vehicle passage depth (E) and the vehicle passage width (WR). When the vehicle passage depth (E) is small, the attitude angle ($\theta_M$) tends to be large and, when the vehicle passage width (WR) is small, the attitude angle ($\theta_M$) tends to be small.

For example, the attitude angle look-up circuit 24 can select the attitude angle ($\theta_M$) such that the smaller the vehicle passage depth (E) is, the larger the selected attitude angle ($\theta_M$) is.

Alternatively, when the vehicle passage depth (E) is larger than the vehicle passage width (WR), the attitude angle look-up circuit 24 looks up the attitude angles ($\theta_M$) at the reversing position (Pb) in an ascending order starting from zero. Meanwhile, when the vehicle passage depth (E) is equal to or smaller than the vehicle passage width (WR), the attitude angle look-up circuit 24 looks up the attitude angles ($\theta_M$) at the reversing position (Pb) in the descending order starting from the attitude angle ($\theta_F$) at the completion of parking. This can reduce wasteful look-up time and achieve information processing load reduction and quick route calculation.

As another alternative, distance determination may be performed by using thresholds set in advance for the vehicle passage depth (E) and the vehicle passage width (WR), respectively. For example, when the vehicle passage depth (E) and the vehicle passage width (WR) are both equal to or smaller than the thresholds or when only the vehicle passage depth (E) is equal to or smaller than the threshold, the attitude angle look-up circuit 24 looks up the attitude angles ($\theta_M$) in the descending order starting from the attitude angle ($\theta_F$) at the completion of parking. When only the vehicle passage width (WR) is equal to or smaller than the threshold, the attitude angle look-up circuit 24 looks up the attitude angles ($\theta_M$) in the descending order starting from the attitude angle ($\theta_F$) at the completion of parking.

The target parking position look-up circuit 25 looks up the target parking positions (Pc) in the parking spot (G), based on the vehicle passage width (WR) and the vehicle passage depth (E). The target parking position (Pc) can be moved by looking up the target parking positions (Pc) based on the vehicle passage width (WR) and the vehicle passage depth (E). An effect similar to that in the case where the vehicle passage width (WR) is increased can be thereby obtained in the route generation. Thus, the route in which the vehicle will not interfere with the obstacles around the vehicle passage can be generated also in an environment in which the vehicle passage width is small.

Figure 16:
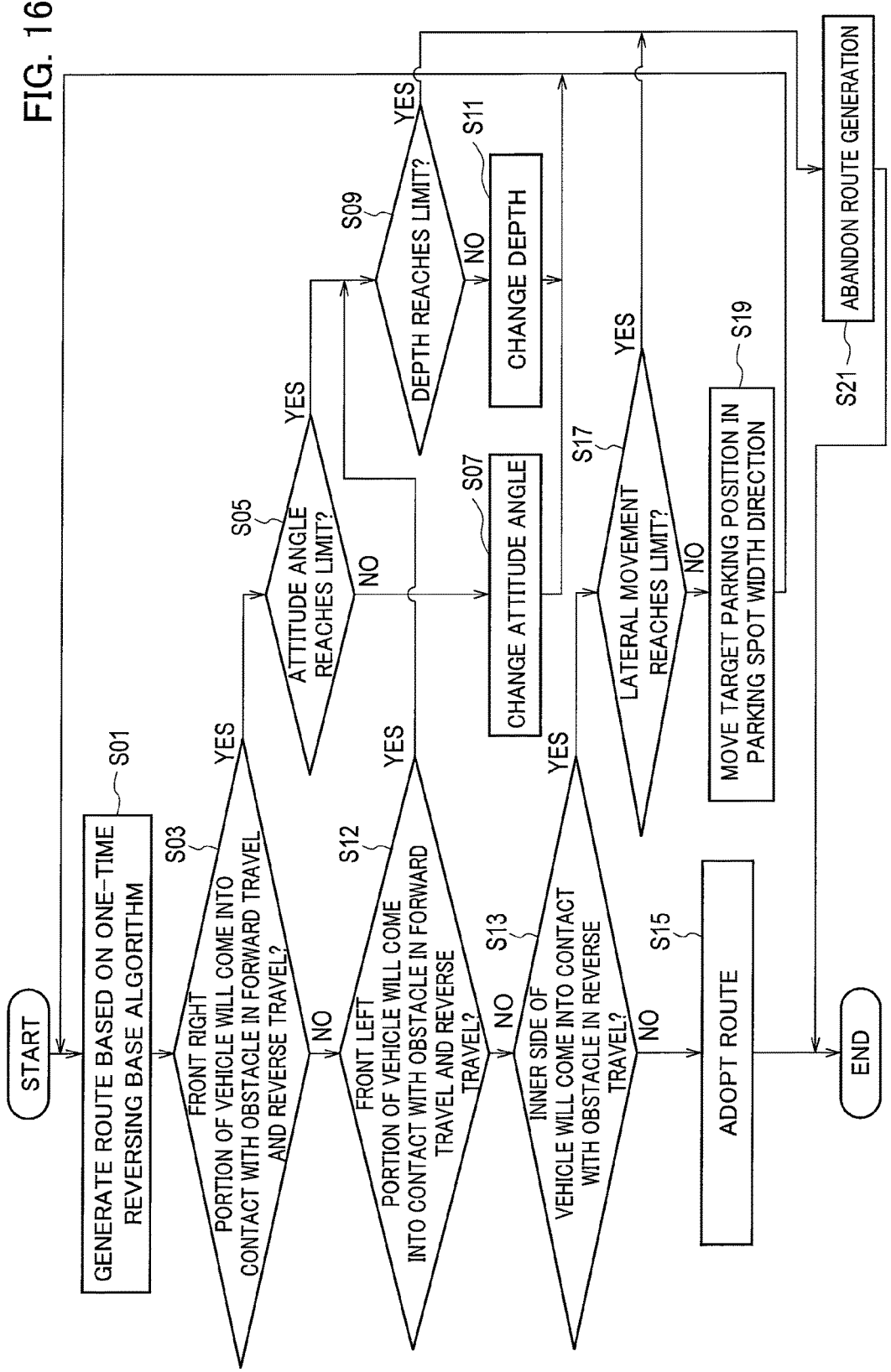
FIG. 16 is a flowchart illustrating an example of a method of generating the "one-time reversing parking route" by using the parking assistance device 10b in FIG. 3B.

A route generation procedure in the parking assistance method of the second embodiment is described with reference to FIG. 16. The route generation procedure is different from that of FIG. 5 in that step S12 is provided between step S03 and step S13.

Figure 17:
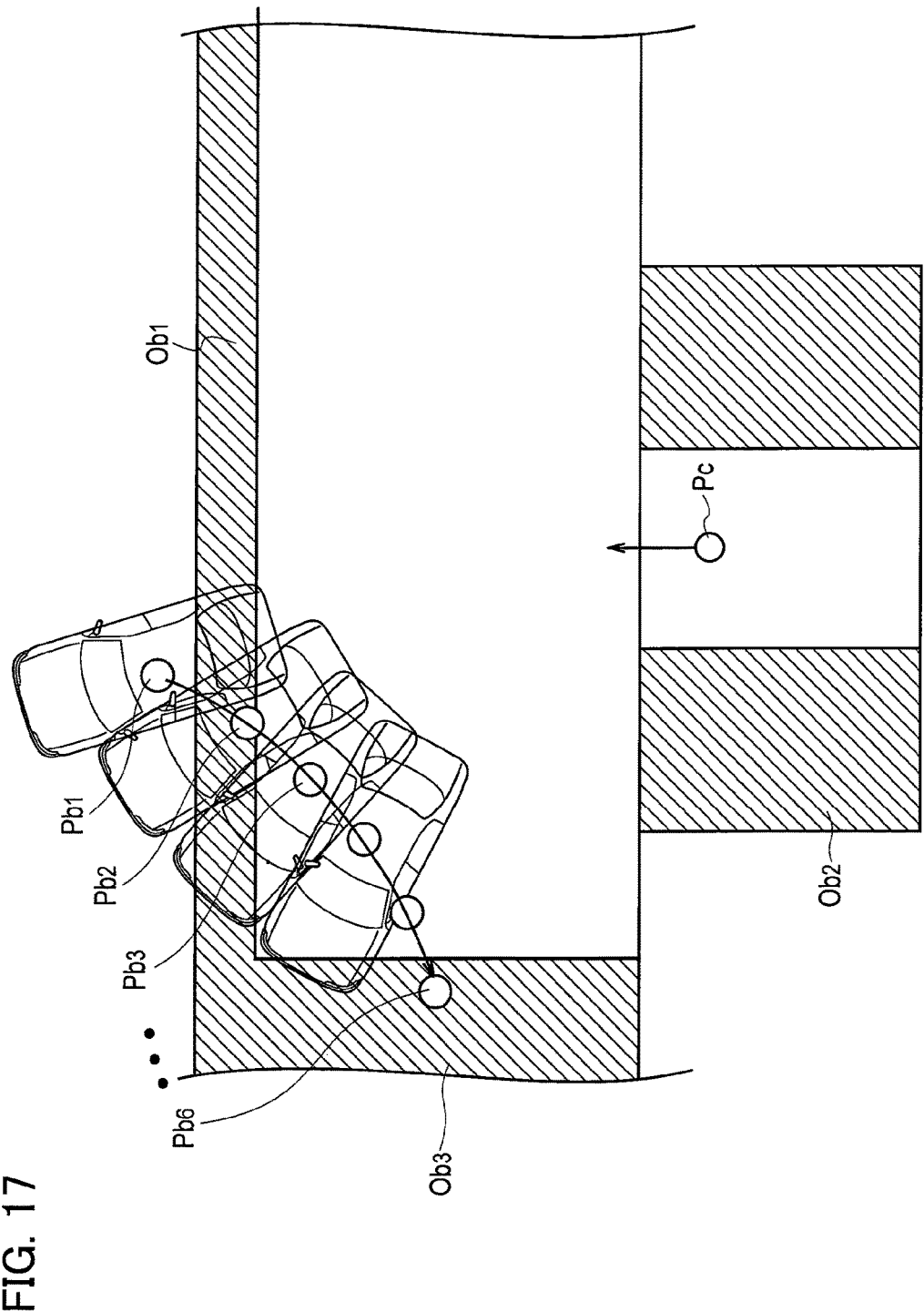
FIG. 17 is a view for explaining a procedure of looking up the attitude angles ($\theta_M$) in a descending order starting from an initial value.

In step S12, the parking assistance controller 10b determines whether the front portion of the vehicle will interfere with the obstacle ($Ob_3$) adjacent to the vehicle passage, at the reversing position (Pb) in the generated route. Specifically, as illustrated in FIG. 17, the parking assistance controller 10b determines whether a left front portion of the vehicle will move outside the vehicle passage (travelable area) and interfere with the obstacle ($Ob_3$) at the reversing position (Pb). When the left front portion will not interfere (NO in S12), the processing proceeds to step S13. When the left front portion will interfere (YES in S12), the processing proceeds to step S09. Other steps S01 to S21 are the same as those in FIG. 5 and description thereof is omitted.

Figure 18:
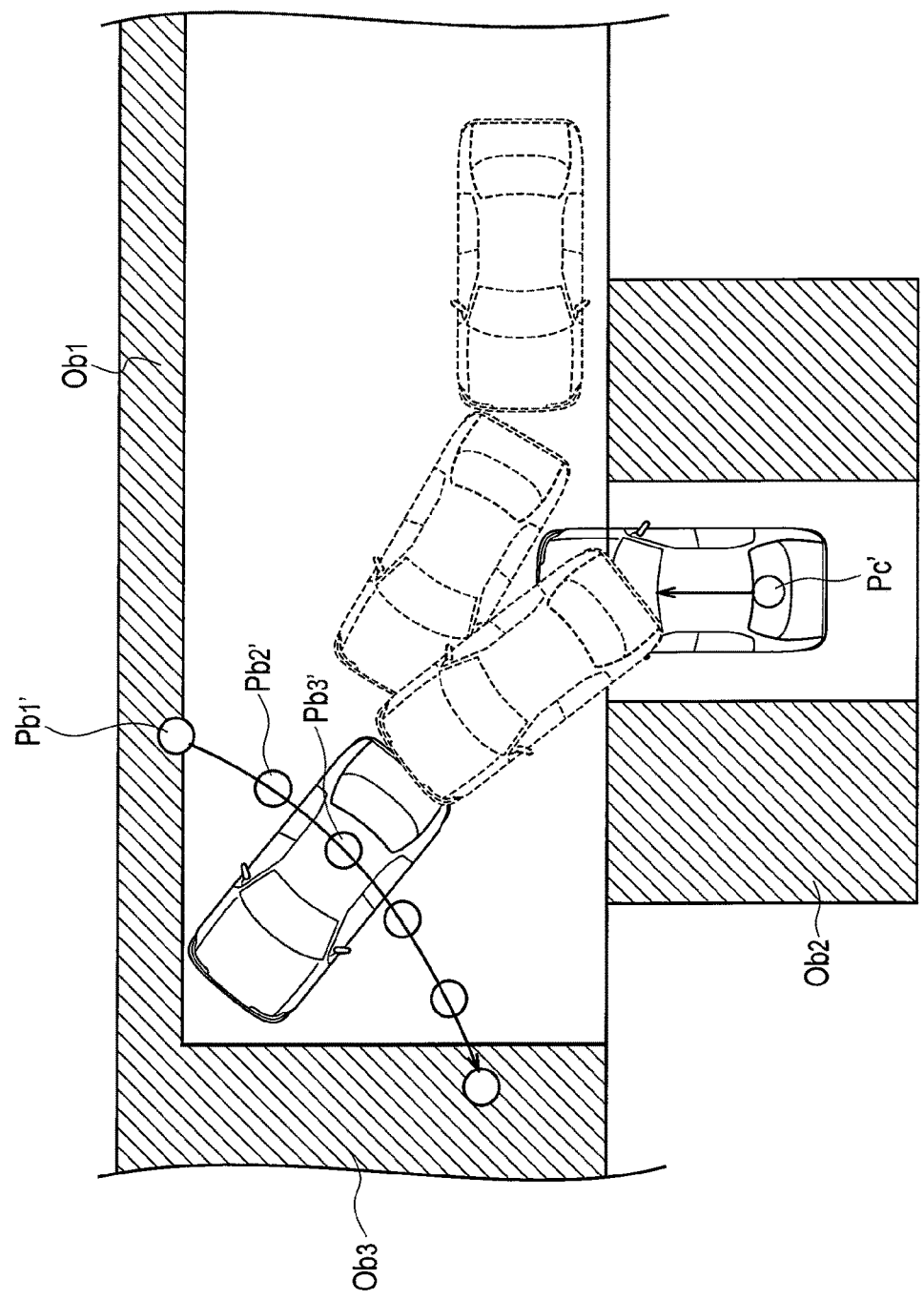
FIG. 18 is a view for explaining procedures of shifting the target parking position (Pc') from that in FIG. 17 in a vehicle entering direction and looking up the attitude angles ($\theta_M$) again.

With reference to FIGS. 17 and 18, description is given of examples of the look-up of the attitude angles ($\theta_M$) by the attitude angle look-up circuit 24 and the look-up of the target parking positions (Pc) by the target parking position look-up circuit 25. As illustrated in FIG. 17, the target parking position (Pc) is first determined and the route generation (S01) and the interference determination (S03) are repeatedly performed while the scanning of the attitude angles ($\theta_M$) is performed in the descending order starting from the initial value. The reversing positions in the route generation performed six times in total are denoted by $Pb_1$, $Pb_2$, $Pb_3$, $Pb_4$, ..., $Pb_6$, respectively. The vehicle will interfere with the obstacles ($Ob_1$, $Ob_3$) at all of the reversing positions ($Pb_1$, $Pb_2$, $Pb_3$, $Pb_4$, ..., $Pb_6$) illustrated in FIG. 17 (YES in S03). When the attitude angle ($\theta_M$) reaches its limit (YES in step S05), as illustrated in FIG. 18, the target parking position (Pc) is shifted in the vehicle entering direction and the new target parking position (Pc') is set (step S11).

The route generation (S01) and the interference determination (S03) are repeatedly performed again while the scanning of the attitude angles ($\theta_M$) is performed in the descending order starting from the initial value. Although the vehicle will interfere with the obstacle ($Ob_1$) at the reversing positions ($Pb_1'$, $Pb_2'$), the vehicles will not interfere with the obstacles ($Ob_1$, $Ob_3$) at the reversing position ($Pb_3'$) (NO in S12). The parking assistance controller 10b looks up the attitude angles ($\theta_M$) of the vehicle at the reversing position (Pb), based on the vehicle passage width (WR) and the vehicle passage depth (E) as described above. The route in which the front portion of the vehicle will not interfere at the reversing position (Pb) with the obstacles (Ob$_1$, Ob$_3$) adjacent to the vehicle passage in the width direction and the depth direction thereof can be thereby generated.

In the second embodiment described above, the following operations and effects can be obtained.

The attitude angle look-up circuit 24 looks up the attitude angles ($\theta_M$) of the vehicle at the reversing position (Pb) based on the vehicle passage width (WR) and the vehicle passage depth (E) to enable generation of the route in which the front portion of the vehicle will not interfere at the reversing position (Pb) with the obstacles adjacent to the vehicle passage in the width direction and the depth direction thereof. The route in which the front portion of the vehicle will not interfere with the obstacles (Ob$_1$, Ob$_3$) can be thereby generated when not only the vehicle passage width (WR) but also the vehicle passage depth (E) is small.

The attitude angle look-up circuit 24 selects the attitude angle ($\theta_M$) such that the smaller the vehicle passage depth (E) is, the larger the selected attitude angle ($\theta_M$) is. Thus, the route in which the vehicle will not interfere with the obstacles around the vehicle passage can be generated also in an environment in which the vehicle passage depth (E) is small.

When the vehicle passage depth (E) is larger than the vehicle passage width (WR), the attitude angle look-up circuit 24 performs the scanning of the attitude angles ($\theta_M$) at the reversing position (Pb) in the ascending order starting from zero. When the vehicle passage depth (E) is equal to or smaller than the vehicle passage width (WR), the attitude angle look-up circuit 24 performs the scanning of the attitude angles ($\theta_M$) at the reversing position (Pb) in the descending order starting from the attitude angle at the completion of parking.

Although the embodiments of the present invention have been described above, it should not be understood that the description and drawings forming part of this disclosure limit the present invention. From this disclosure, various alternative embodiments, examples, and operations techniques will be found by those skilled in the art.

REFERENCE SIGNS LIST 21 route generating circuit
22 vehicle passage width obtaining circuit
23 parking width obtaining circuit
24 attitude angle look-up circuit
25 target parking position look-up circuit
26 vehicle passage depth obtaining circuit
E vehicle passage depth
G parking spot
Ob$_1$, Ob$_2$, Ob$_3$ obstacle
Pa parking start position
Pb reversing position
Pc target parking position
$\theta_M$, $\theta_F$ attitude angle
$W_R$ vehicle passage width

The invention claimed is:

1. A parking assistance device configured to assist a parking operation in which a vehicle is perpendicularly parked in a parkable area, comprising a controller configured to:
   generate a route along which the vehicle is to travel forward from a parking start position to a reversing position and then travel from the reversing position to the parkable area;
   obtain a width of a vehicle passage which the parkable area faces;
   look up attitude angles of the vehicle at the reversing position to enable generation of the route in which a front portion of the vehicle will not interfere at the reversing position with an obstacle adjacent to the vehicle passage in a width direction of the vehicle passage, wherein the attitude angles are based on the width of the vehicle passage; and
   automatically control a steering operation of the vehicle to guide the vehicle into the parkable area along the route that is generated using the attitude angles, wherein the route is generated prior to the vehicle traveling the route.

2. The parking assistance device according to claim 1, wherein the attitude angles are any of angles relative to a travel direction of the vehicle at parking start, angles relative to the obstacle adjacent to the vehicle passage in the width direction of the vehicle passage, and angles relative to an obstacle adjacent to the parkable area in a width direction of the parkable area.

3. The parking assistance device according to claim 1, wherein the controller is further configured to:
   look up the attitude angles at the reversing position in a descending order starting from the attitude angle at completion of parking; and
   select the largest attitude angle from the attitude angles of the vehicle which enable generation of the route in which the front portion of the vehicle at the reversing position will not interfere at the reversing position with the obstacle adjacent to the vehicle passage in the width direction of the vehicle passage.

4. The parking assistance device according to claim 1, wherein the controller is further configured to:
   look up the attitude angles at the reversing position in a descending order starting from a start attitude angle; and
   set the start attitude angle such that the smaller the width of the vehicle passage is, the smaller the start attitude angle is.

5. The parking assistance device according to claim 1, wherein the controller is further configured to:
   obtain a depth of the vehicle passage; and
   look up the attitude angles of the vehicle at the reversing position based on the width of the vehicle passage and the depth of the vehicle passage to enable generation of the route in which the front portion of the vehicle will not interfere at the reversing position with obstacles adjacent to the vehicle passage in the width direction and a depth direction of the vehicle passage.

6. The parking assistance device according to claim 5, wherein the controller is configured to select the attitude angle such that the smaller the depth of the vehicle passage is, the larger the selected attitude angle is.

7. The parking assistance device according to claim 5, wherein
   when the depth of the vehicle passage is larger than the width of the vehicle passage, the controller is configured to look up the attitude angles at the reversing position in an ascending order starting from zero, and
   when the depth of the vehicle passage is equal to or smaller than the width of the vehicle passage, the controller is configured to look up the attitude angles at the reversing position in a descending order starting from the attitude angle at completion of parking.

8. The parking assistance device according to claim 1, wherein when the route in which the front portion of the vehicle will not interfere at the reversing position with the obstacle adjacent to the vehicle passage in the width direction of the vehicle passage is impossible to generate by looking up the attitude angles of the vehicle at the reversing position, the controller is configured to:
    move a target parking position in an entering direction of the vehicle, from an end of the parkable area on a side from which the vehicle enters; and
    look up the attitude angles of the vehicle at the reversing position, based on the moved target parking position.

9. The parking assistance device according to claim 8, wherein the controller is further configured to:
    obtain a width of the parkable area; and
    select the target parking position to which a movement amount is the smallest in the entering direction of the vehicle, from the target parking positions which enable generation of the routes in which the vehicle will not interfere with the obstacle adjacent to the parkable area in the width direction of the parkable area.

10. The parking assistance device according to claim 8, wherein when the route in which the front portion of the vehicle will not interfere at the reversing position with the obstacle adjacent to the vehicle passage in the width direction of the vehicle passage is impossible to generate by moving the target parking position in the entering direction of the vehicle from the end of the parkable area on the side from which the vehicle enters and by looking up the attitude angles of the vehicle at the reversing position, the controller is configured to determine that the route along which the vehicle is to travel to the parkable area via the reversing position is impossible to generate.

11. The parking assistance device according to claim 1, wherein the controller is further configured to:
    set the attitude angle of the vehicle at the reversing position,
    determine whether the front portion of the vehicle will interfere with the obstacle adjacent to the vehicle passage, at the reversing position in the route generated based on the set attitude angle, and when determining that the front portion will interfere,
    change the attitude angle of the vehicle at the reversing position; and
    determine whether the front portion of the vehicle will interfere with the obstacle adjacent to the vehicle passage in the width direction of the vehicle passage, at the reversing position in the route generated based on the changed attitude angle.

12. The parking assistance device according to claim 1, wherein the controller is further configured to look up target parking positions in the parkable area based on the width of the vehicle passage to enable generation of the route in which the front portion of the vehicle will not interfere at the reversing position with the obstacle adjacent to the vehicle passage in the width direction of the vehicle passage.

13. A parking assistance method of assisting a parking operation in which a vehicle is perpendicularly parked in a parkable area, comprising:
    generating a route along which the vehicle is to travel forward from a parking start position to a reversing position and then travel from the reversing position to the parkable area;
    obtaining a width of a vehicle passage which the parkable area faces;
    looking up attitude angles of the vehicle at the reversing position to enable generation of the route in which a front portion of the vehicle will not interfere at the reversing position with an obstacle adjacent to the vehicle passage in a width direction of the vehicle passage, wherein the attitude angles are based on the width of the vehicle passage; and
    automatically controlling a steering operation of the vehicle to guide the vehicle into the parkable area along the route that is generated using the attitude angles, wherein the route is generated prior to the vehicle traveling the route.

14. The parking assistance device of claim 1, wherein the route comprises travelling in a first direction from the parking start position to the reversing position and travelling in a second direction from the reversing position to the parkable area.

15. The parking assistance device of claim 1, wherein the attitude angles comprise angles relative to obstacles adjacent to the vehicle passage in the width direction.

16. The parking assistance device of claim 15, wherein the attitude angles further comprise angles relative to obstacles adjacent to the parkable area in the width direction.

17. The parking assistance device of claim 1, wherein the attitude angles comprise angles relative to obstacles adjacent to the parkable area in the width direction.

18. A parking assistance device configured to assist a parking operation in which a vehicle is perpendicularly parked in a parkable area, comprising a controller configured to:
    generate a route along which the vehicle is to travel to the parkable area via a reversing position;
    obtain a width of a vehicle passage that the parkable area faces;
    look up attitude angles of the vehicle at the reversing position based on the width of the vehicle passage to enable generation of the route in which a front portion of the vehicle will not interfere at the reversing position with an obstacle adjacent to the vehicle passage in a width direction of the vehicle passage, wherein the attitude angles are looked up in a descending order starting from at least one of the attitude angle at completion of parking or a start attitude angle;
    if the attitude angles are looked up in a descending order starting from the attitude angle at the completion of parking, select the largest attitude angle from the attitude angles of the vehicle that enable generation of the route in which the front portion of the vehicle at the reversing position will not interfere with the obstacle adjacent to the vehicle passage in the width direction of the vehicle passage; and
    if the attitude angles are looked up in a descending order starting from a start attitude angle, set the start attitude angle such that the smaller the width of the vehicle passage, the smaller the start attitude angle is.

* * * * *